455-618 AU 233 EX
FIP8106 XR 2,865,988

Dec. 23, 1958 N. J. CAFARELLI, JR 2,865,988

QUASI-STEREOSCOPIC SYSTEMS

Filed May 26, 1953 2 Sheets-Sheet 1

INVENTOR
NICHOLAS J. CAFARELLI, JR.
BY
ATTORNEY

Dec. 23, 1958 N. J. CAFARELLI, JR 2,865,988

QUASI-STEREOSCOPIC SYSTEMS

Filed May 26, 1953

2 Sheets-Sheet 2

INVENTOR
NICHOLAS J. CAFARELLI, JR.

BY [signature]
ATTORNEY 2,865,988
Patented Dec. 23, 1958

2,865,988

QUASI-STEREOSCOPIC SYSTEMS

Nicholas J. Cafarelli, Jr., Bogota, N. J., assignor to International Telephone and Telegraph Corporation, a corporation of Maryland Application May 26, 1953, Serial No. 357,428

6 Claims. (Cl. 178—6.5)

This invention relates to stereoscopy and more particularly to a quasi-stereoscopic viewing system including means incorporated in combination with a conventional two dimensional viewing system, such as motion picture projectors, television receivers, and the like, to impart to a spectator a stereoscopic impression.

Human beings are enabled to judge depth in three dimensional space chiefly because they have two eyes, each of which sees a slightly different view of the objects before them. However, the usual techniques employed in reproducing a scene for later viewing, such as in the motion picture and television industries of today, in both black and white, and color, lose the third dimension.

The desire for achieving a three dimensional picture, in both the entertainment field and as an aid in remote manipulation of objects in three dimensional space, has aroused great activity in stereoscopy. The apparatus heretofore employed to achieve a depth perception in viewing systems have required the application of new techniques in the taking of pictures by cameras including at least two lenses whereby a stereoscopic pair of pictures are impressed on film, either on a single film strip or two film strips properly synchronized, for transmission by means of television techniques, or for motion picture projecting techniques, in a manner whereby each of the two dimensional pictures, stereoscopically related, are viewed by the eye of a spectator corresponding to the lens of the camera, right or left, with which the picture was taken.

It will be obvious to those skilled in the art that special cameras and film techniques, as well as special projectors, must be employed in the motion picture industry and that the cameras and transmitting techniques, as well as the receiver techniques, in a television system must be radically changed to achieve the desired depth perception as set forth by the teachings of the prior art.

Therefore, it is an object of this invention to provide a relatively simple and inexpensive black and white, or color, viewing system to impart a stereoscopic impression to a spectator.

Another object of the present invention is to provide a viewing system including the modification of a conventional two dimensional viewing system for presenting frame elements of a picture to a spectator in a predetermined manner to impart a quasi-stereoscopic impression of moving objects, in either black and white, or color, during successive optical impression periods.

A feature of this invention is to provide a viewing system including means to establish a sequence of frame elements for observation during successive impression periods wherein each succeeding impression period contains an exact replica of one of the frame elements viewed in the preceding impression period. The viewing system further includes means to present to said observer adjacent ones of said frame elements during said impression period and means to limit during each of said impression periods the adjacent frame elements therein for right and left eye viewing such that a quasi-stereoscopic impression is imparted to an observer.

Another feature of this invention is the modification of a conventional black and white, or color, motion picture projector enabling the projection of adjacent frame elements of a conventional film simultaneously upon a screen in each successive impression period such that each successive impression period contains an exact replica of one of the frame elements viewed in the preceding impression period. Intermediate the projector and the screen is disposed a light filter assembly to impart a distinguishing characteristic to adjacent frame elements in each impression period to limit the frame elements therein for right and left eye viewing. A spectator viewing the screen is provided with spectacles including eye pieces characterized to pass light therethrough such that the right eye and left eye views of each impression period for appropriately right and left eye viewing to impart a quasi-stereoscopic impression.

A further feature of this invention is the modification of a conventional television receiver including a plurality of paths for the received picture signal, at least one of said paths including therein a means to delay the presentation of all or a portion of the picture signal to the display tube by a given amount, and an electronic switch associated with said paths to establish from a conventional television picture signal successive frame elements in time sequence for optical viewing during successive impression periods on the screen of the picture tube. The light output on the screen of the picture tube is passed through a light filtering assembly to provide a distinguishing characteristic to the successive frame elements such that in each impression period the adjacent frame elements are limited for right and left eye viewing. A spectator viewing the thusly derived picture is provided with eye glasses having lenses capable of passing the right eye and left eye images of each impression period for appropriate right and left eye viewing to impart a quasi-stereoscopic impression.

The above-mentioned and other features and objects of this invention will become more apparent by reference to the following description taken in conjunction with the accompanying drawings, in which.

It has been discovered that a stereoscopic visual impression of moving objects may be attained by viewing one frame element of a picture with one eye and viewing an adjacent frame element with the other eye within a given impression period. The term impression period hereinabove and hereinafter employed has reference to that amount of time necessary to display two adjacent, but not necessarily contiguous, frame elements of a picture limited in a given manner to produce right and left eye views to complete the stereoscopic optical impression desired. It has been found that this method of obtaining quasi-stereoscopic affects may be accomplished by modifying a conventional motion picture projector of either the black and white, or color, type and may also be accomplished by modifying a home television receiver to obtain the desired three dimensional impression on either black and white, or color, television viewing systems without modifying the techniques and equipment for taking the motion pictures or the techniques and equipment for transmitting a television signal.

By employing the adjacent picture frame elements directly, as established by conventional motion picture film, for projecting simultaneously upon a screen, or the adjacent picture frame elements, as predeterminedly derived from the picture frame portions of a television signal, for presenting in rapid succession upon the screen of a television receiver, there is obtained two picture frame elements in an impression period having slightly displaced images. These displaced picture frame elements are limited in a manner wherein one of the displaced picture frame elements are viewed by one eye and the other frame element is viewed by the other eye to effectively present to the optical nerves of an observer a quasi-stereoscopic impression. In either the taking of a motion picture or the pick-up of a television program, either a live program or a film program, it is immaterial whether the camera moves and the object remains stationary or the object moves and the camera remains stationary. It is however, preferred to have the objects stationary and the camera moving relative to the movement of an object to obtain the background of the subject object in three dimensions. If the television pictures for transmission and the motion picture film are obtained in a conventional manner by a stationary camera with the subject moving, the background of said subject will not appear as three dimensions since there would be no lateral displacement of the background between successive frame elements.

Figure 1:
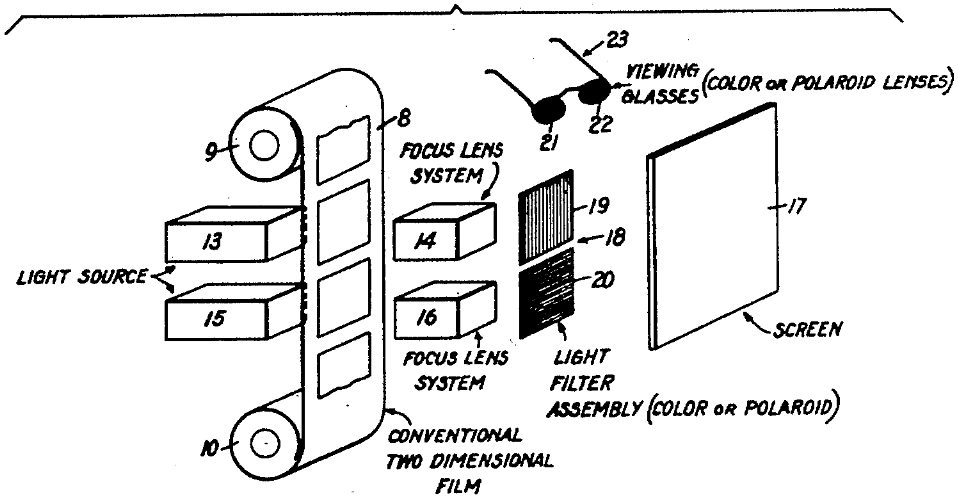
Fig. 1 is a diagrammatic illustration of an embodiment of a viewing system following the principles of my invention for achieving a quasi-stereoscopic impression.
Figure 2:
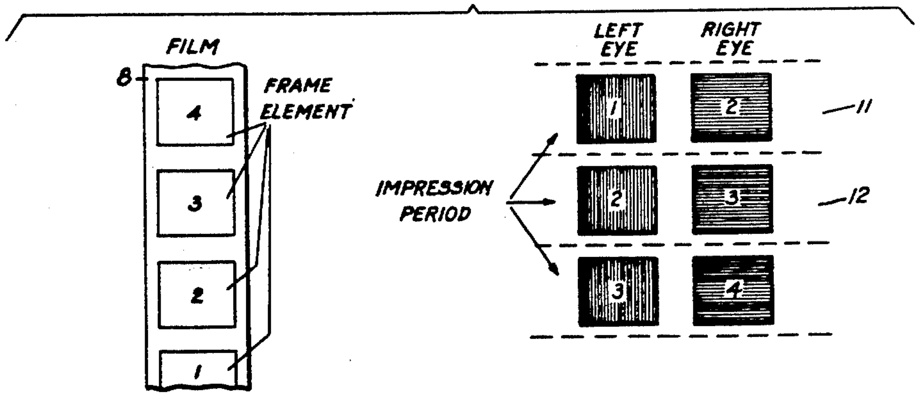
Fig. 2 is a diagrammatic representation useful in explaining the operation of the embodiment of Fig. 1.

Referring to Figs. 1 and 2, an embodiment of my quasi-stereoscopic viewing system is illustrated following the principles of operation outlined above wherein a conventional motion picture projector is modified to provide a means to establish a sequence of frame elements for viewing during succesive impression periods including two dimensional motion picture film 8 obtained by following the normal techniques for film processing and the film transport mechanism represented diagrammatically by reels 9 and 10 such that a frame element, say frame element 2, may appear as a right eye image in impression period 11 and as a left eye image or view in impression period 12 as illustrated in Fig. 2. The viewing system of this embodiment further includes means to present to an observer adjacent ones of said frame elements during each impression period and means to limit during each of said impression periods the adjacent frame elements therein for right and left eye viewing.

The means to present includes the normal optical arrangement employed with a conventional motion picture projector, such as light source 13 and focus lens system 14, plus a second optical arrangement disposed in vertical alignment with the normal optical system, such as light source 15 and focus lens system 16, and a viewing screen 17. The conventional light projecting system and the added light projecting system are so disposed vertically that during one impression period two adjacent frame elements are projected simultaneously upon screen 17 to obtain a simultaneous presentation of two adjacent frame elements wherein the images thereof are slightly displaced with respect to each other.

Intermediate between the lens systems 14 and 16 of this embodiment is disposed a light filter assembly 18 comprising a portion of the means to limit including as illustrated filter elements 19 and 20 to polarize the respective light energy emitted from each of the lens systems 14 and 16 such that these separate light energy beams are distinguishable by being polarized at right angles with respect to each other. The filter element 19 limits the light from lens 14 for either right or left eye viewing while the light from lens system 16 is limited by filter element 20 for either left or right eye viewing depending upon the relative location of polaroid lenses 21 and 22 included in the spectacles 23 worn by an observer. Whether the image carried by the light from the respective lens systems 14 and 16 are right or left eye views depends upon the correspondence between the filter elements 19 and 20 and the polaroid lenses 21 and 22 of spectacles 23. As illustrated, the light from lens system 14 passing through filter element 19 is a left eye view since filter element 19 polarizes the light vertically and lens 22 is arranged to pass only vertically polarized light. Similarly, the light from lens system 16 is horizontally polarized by filter element 20 and is passed through the polaroid lens 21, both of these views being received by the observer after the light has impinged upon screen 17.

The sequence of operation as film 8 travels through the optical arrangements incorporated herein is illustrated in Fig. 2 wherein it is illustrated that impression period 11 comprises the adjacent frame elements 1 and 2 while the succeeding impression period 12 includes the simultaneous projection of frame elements 2 and 3 upon screen 10. It will be observed that as film 8 travels through the light projection arrangement from one impression period to the next impression period, one frame element that appeared in the preceding impression period will be included, as though it were delayed, in the succeeding impression period. However, this frame element in question will be limited for left eye viewing in the following impression period if it had been limited for the right eye viewing in the preceding impression period, as illustrated by frame element 2 appearing in impression period 11 as a right eye view and in the succeeding impression period 12 as a left eye view. Therefore, the successive impression periods are composed of two frame elements adjacent one to another on the film strip 8 with one frame element of a preceding impression period being replaced by the next frame element to maintain at all times adjacent frame elements in an impression period as the film strip travels through the light projection arrangement.

While the description of this modified motion picture projector for imparting quasi-stereoscopic impressions to an observer has delt with right and left eye viewing limited by means of polaroid filters for polarizing light energy beams normally to each other and polaroid lenses to distinguish the polarized views, it is conceivable and has been found practical to obtain the limiting action required by substituting appropriate color filter elements for filter elements 19 and 20, such as red and blue filter elements, respectively, and replacing the polarized lenses 21 and 22 by corresponding color lenses thereby providing another means to limit the adjacent frame elements of an impression period in accordance with the principles of this invention.

Figure 3:
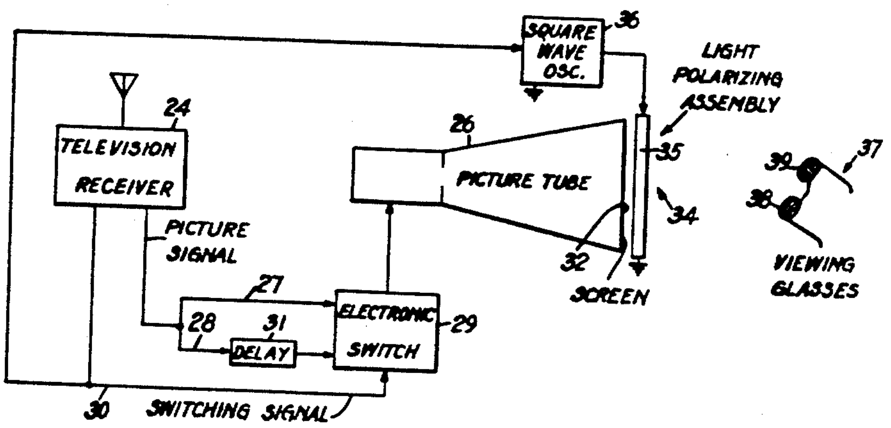
Fig. 3 is a diagrammatic illustration of another embodiment of a viewing system following the principles of my invention.
Figure 4:
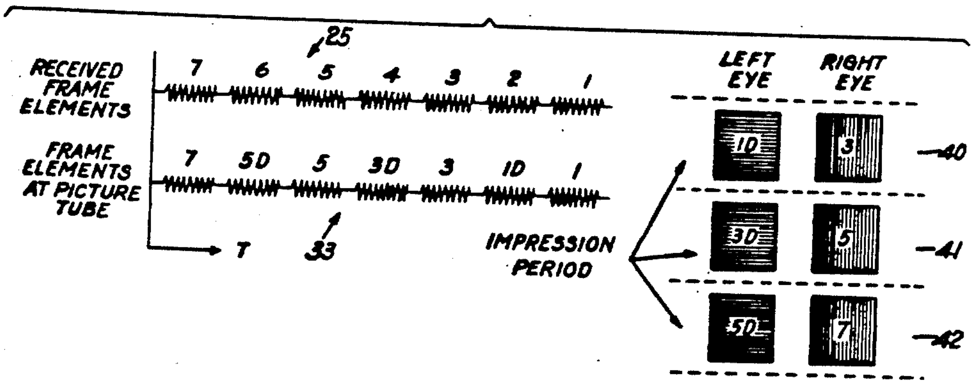
Fig. 4 is a diagrammatic representation useful in explaining the operation of the embodiment of Fig. 3.

Figs. 3 and 4 illustrate another embodiment of my viewing system whereby a quasi-stereoscopic impression is imparted to a spectator. The essential elements of this viewing system includes a standard television receiver 24 for receipt of a normal television signal as may be transmitted from a television transmitter including synchronizing information and the picture signal comprising a plurality of television signal frame portions as substantially illustrated by curve 25 in Fig. 4. The detected picture signal of receiver 24 is coupled to picture tube 26 through an arrangement including a pair of paths 27 and 28 and an electronic switch 29 appropriately timed for opening and closing by a given sync signal coupled from receiver 24 along conductor 30. Path 28 includes therein a delay device 31 having a delay time substantially equivalent to the time required for presenting a frame portion of the picture signal, or a multiple thereof. Delay device 31 may take the form of well-known storage devices.

This electronic arrangement disposed intermediate the normal receiver 24 and picture tube 26 constitutes a portion of the means to establish a sequence of frame elements for optical viewing during successive impression periods such that there is presented on screen 32 of picture tube 26 a sequence of adjacent frame elements including a normal undelayed picture frame portion and a delayed version of the picture frame portion through the cooperation of the electronic switch 29. Electronic switch 29 is arranged to be triggered by first pulse of every second field sync signal of a television signal such that the even frame portions of the received signal are omitted and replaced by the delayed version of an odd picture frame portion substantially as illustrated in 33 of Fig. 4.

A light filtering assembly 34 is illustrated as including a Kerr cell 35 responsive to a square wave oscillator 36. Oscillator 36 has a repetition rate of one cycle per two frame portions such that the derived adjacent frame elements presented within an impression period are limited for right and left eye viewing by an observer equipped with viewing glasses 37 including therein corresponding polaroid lenses 38 and 39.

A synchronized operation of electronic switch 29 and square wave oscillator 36 will present one of the derived frame elements polarized in one sense and the second derived frame element of an impression period polarized in the opposite sense. Fig. 4 illustrates a sequence of impression periods 40, 41 and 42 illustrating the inclusion within each impression period of derived adjacent frame elements as presented to picture tube 26 with the left eye view horizontally polarized and the right eye view vertically polarized. Impression period 40 is illustrated as including the delayed version of television frame portion 1 and the normal undelayed television picture frame portion 3 while the succeeding impression period 41 includes therein the identical image representation of frame portion 3 in the form of the delayed version of frame portion 3 and the undelayed version of picture frame portion 5. This pattern continues successively in much the same manner as is accomplished in the motion picture projection viewing system described in connection with Figs. 1 and 2.

The diagram of Fig. 3 and the discussion thereof in connection with Fig. 4 has been directed primarily toward a black and white television receiving system to impart a quasi-stereoscopic impression. However, it is within the scope of this invention to adapt a color television receiver employing a plurality of channels for handling the picture portions including the different color signals as is now known in the color television art. To accomplish the desired picture frame portion delay in accordance with the principles of this invention, a delay device would be placed in one of the color channels to achieve the necessary lateral displacement between corresponding color channel frame elements. The screen of the picture tube would be viewed through appropriately colored spectacles wherein the delayed color channel would have an effect substantially as described hereinabove with respect to black and white for imparting a quasi-stereoscopic impression. Furthermore, the light polarizing assembly 34 of Fig. 3 may be simplified by an arrangement of two picture tubes having their screens permanently polarized at right angles to each other associated with switch 29 in a manner to cause adjacent frame elements to be switched between the picture tubes to impart a quasi-stereoscopic impression to an observer.

While I have described above the principles of my invention in connection with specific apparatus, it is to be clearly understood that this description is made only by way of example and not as a limitation to the scope of my invention as set forth in the objects thereof and in the accompanying claims.

I claim:

1. A viewing system for imparting a quasi-stereoscopic impression to an observer during successive optical impression periods comprising a television receiver for receiving normal television signals including a picture signal and synchronizing signals, a plurality of picture signal paths coupled to the picture signal output of said receiver, a delay device having a predetermined time delay disposed in one of said signal paths, an electronic switch coupled in common to the output of said plurality of signal paths and responsive to a given one of said synchronizing signals, said signal paths, said delay device and said electronic switch under control of said given one of said synchronizing signals cooperating to derive from the frame portions of said picture signal a rapid sequence of adjacent frame elements for presentation in said impression periods, each succeeding impression period containing an exact replica of one of the frame elements present in the preceding impression period, means coupled to the output of said electronic switch to present to said observer said adjacent frame elements during said impression periods, and means in coupled relation with the output of said means to present to limit during each of said impression periods the said adjacent frame elements for right and left eye viewing.

2. A viewing system according to claim 1, wherein said television receiver is of the black and white type and said plurality of picture signal paths number two for presenting delayed and undelayed frame portions of said picture signal to said electronic switch, said electronic switch being controlled by said given one of said sychronizing signals to pass a delayed version of a first frame portion of said television signal and an undelayed version of a second frame portion thereof for presentation in rapid succession to establish the necessary sequence of frame elements for each successive impression period, said second frame portion being separated from said first frame portion by a frame portion intermediate thereof.

3. A viewing system according to claim 1, wherein said means to present comprises a cathode ray type picture viewing device including an electron beam responsive to the rapid sequence of adjacent frame element signals from said electron switch and a viewing screen for presenting the said adjacent frame elements for viewing in each of said impression periods.

4. A viewing system according to claim 3, wherein said means to limit comprises a light filter assembly contiguous with said viewing screen to impart distinguishing light characteristics to the said adjacent frame elements of said impression period to provide right and left eye images and spectacles worn by an observer including light filter lenses therein responsive to the corresponding light characteristics of said right and left eye images.

5. A viewing system according to claim 4, wherein said light filter assembly includes a controllable light polarizing cell and a square wave oscillator coupled thereto to alternately impart horizontal and vertical polarization to said adjacent frame elements and said light filter lenses comprise polaroid lenses having planes of polarization at right angles with respect to each other.

6. A viewing system according to claim 4, wherein said light filter assembly comprises a Kerr cell and a square wave oscillator coupled thereto having a repetitious rate of one cycle per two frame portions of said television signal.

References Cited in the file of this patent

UNITED STATES PATENTS

| | | |
|---|---|---|
| 1,559,893 | Lane et al. | Nov. 3, 1925 |
| 2,336,938 | Keijzer | Dec. 14, 1943 |
| 2,436,516 | Larsen | Feb. 24, 1948 |
| 2,665,335 | Cahen | Jan. 5, 1954 |

FOREIGN PATENTS

| | | |
|---|---|---|
| 482,360 | Great Britain | June 24, 1936 |